United States Patent
Åberg (10) Patent No.: US 9,360,977 B2
(45) Date of Patent: Jun. 7, 2016

(54) INPUT INTERFACE, HANDHELD ELECTRONIC DEVICE AND METHOD OF PRODUCING AN INPUT INTERFACE

(75) Inventor: Peter Åberg, Vinslöv (SE)

(73) Assignee: Sony Mobile Communications AB, Lund (SE)

( * ) Notice: Subject to any disclaimer, the term of this patent is extended or adjusted under 35 U.S.C. 154(b) by 54 days.

(21) Appl. No.: 14/363,535

(22) PCT Filed: Apr. 18, 2012

(86) PCT No.: PCT/EP2012/001695
§ 371 (c)(1),
(2), (4) Date: Aug. 8, 2014

(87) PCT Pub. No.: WO2013/083207
PCT Pub. Date: Jun. 13, 2013

(65) Prior Publication Data
US 2014/0362045 A1    Dec. 11, 2014

Related U.S. Application Data

(60) Provisional application No. 61/568,438, filed on Dec. 8, 2011.

(51) Int. Cl.
*G06F 3/044* (2006.01)
*G06F 3/0488* (2013.01)
*G06F 3/041* (2006.01)

(52) U.S. Cl.
CPC .............. *G06F 3/044* (2013.01); *G06F 3/0414* (2013.01); *G06F 3/0416* (2013.01); *G06F 3/0488* (2013.01); *G06F 2203/04105* (2013.01); *Y10T 29/49155* (2015.01)

(58) Field of Classification Search
CPC ..................... G06F 2203/04105; G06F 3/0414; G06F 3/0416; G06F 3/044; G06F 3/0488

USPC ........................................................... 345/173
See application file for complete search history.

(56) References Cited

U.S. PATENT DOCUMENTS

| 2004/0156168 | A1* | 8/2004 | LeVasseur | ............ | G06F 3/0414 |
| | | | | | 361/679.21 |
| 2009/0015564 | A1* | 1/2009 | Ye | .......................... | G06F 3/0414 |
| | | | | | 345/173 |

(Continued)

FOREIGN PATENT DOCUMENTS

| EP | 1 983 411 | 10/2008 |
| EP | 2 065 911 | 6/2009 |

(Continued)

OTHER PUBLICATIONS

International Preliminary Report on Patentability for International Application No. PCT/EP2012/004470 (Jun. 10, 2014).

*Primary Examiner* — Viet Pham
(74) *Attorney, Agent, or Firm* — Wolf, Greenfield & Sacks, P.C.

(57) ABSTRACT

An input interface (3) comprises a display (23), a window (21) overlaid on the display (23), and a housing (13-15) supporting the window (21). A first sensor arrangement (31, 32) is configured to sense a position of a touch action on the window (21) in two dimensions. The first sensor arrangement (31, 32) comprises a first plurality of conductive traces (32). A second sensor arrangement (41-43) is configured to sense a magnitude of a force applied by the touch action onto the window (21). The second sensor arrangement (41-43) comprises a second plurality of conductive traces (41, 42) and a force sensing material (43). The first plurality of conductive traces (32) and the second plurality of conductive traces (41, 42) are positioned on an inner face (30) of the window (21) and attached to the inner face (30) of the window (21). The force sensing material (43) is attached to the inner face (30) of the window (21) such that the force sensing material (43) contacts the second plurality of conductive traces (41, 42).

14 Claims, 8 Drawing Sheets

(56) References Cited

U.S. PATENT DOCUMENTS

| | | | |
|---|---|---|---|
| 2010/0220065 A1* | 9/2010 | Ma | G06F 3/016 345/173 |
| 2011/0157087 A1 | 6/2011 | Kanehira et al. | |
| 2011/0175845 A1 | 7/2011 | Honda et al. | |
| 2011/0304567 A1* | 12/2011 | Yamamoto | G06F 3/0416 345/173 |
| 2012/0026120 A1* | 2/2012 | Kuo | G06F 3/0414 345/173 |

FOREIGN PATENT DOCUMENTS

| | | |
|---|---|---|
| EP | 2234134 A1 | 9/2010 |
| EP | 2339434 A2 | 6/2011 |

* cited by examiner

INPUT INTERFACE, HANDHELD ELECTRONIC DEVICE AND METHOD OF PRODUCING AN INPUT INTERFACE

CROSS-REFERENCES TO RELATED APPLICATIONS

This application is a 35 U.S.C. §371 U.S. national entry of International Application PCT/EP2012/001695 having an International filing date of Apr. 18, 2012, which claims the benefit to U.S. Provisional Application No. 61/568,438, filed Dec. 8, 2011, the entire contents of which are incorporated herein by reference in their entirety.

FIELD OF THE INVENTION

The application relates to an input interface, a handheld electronic device having an input interface, and a method of producing an input interface. The application relates in particular to input interfaces which include a sensor arrangement configured to sense a position of a touch action.

BACKGROUND OF THE INVENTION

Handheld electronic devices provide functionalities which continue to be enhanced. With increasing processing capabilities and functionalities provided in the handheld electronic device, it is increasingly challenging to provide input interfaces which allow the variety of functionalities to be controlled in an intuitive manner. Touch sensors which sense a touch action enhance the ways in which a user may interact with the handheld electronic device. Touch sensors may be configured such that they provide information on the location at which a user touches a window. Touch sensors may be configured to discriminate multi-touch scenarios in which several fingers are used to simultaneously actuate different regions of the touch sensor panel, and/or to track the movement of a user's finger across the window. Such detection capabilities allow different functionalities of the handheld electronic device to be controlled in a way in which the location of one or plural touch actions or a movement pattern of the user's fingers across a window may encode different control commands. The two-dimensional position(s) of the touch action are the input data which are evaluated to control operation of the handheld electronic device.

One approach to further enhance the operation of the input interface is to derive information on a size of an area at which a user contacts the window of the input interface. The size of this area provides information on the way in which the user places his or her finger against the window. For illustration, the area over which a touch sensor is actuated may vary depending on whether the user pushes more or less strongly against the window, or depending on whether a smaller or larger finger is placed against the window. While this approach does not require a separate sensor and derives additional information from the size of the area in which the user's finger contacts the input interface, it has shortcomings. It may be challenging or impossible to discriminate cases in which a user pushes against the window lightly with his index finger from cases in which the user pushes strongly with his little finger. When a user places a rigid object, such as a pen-type device, against the window, it is inherently difficult to derive information other than the two spatial coordinates defining the position of the touch action with conventional touch sensors.

SUMMARY

There is a continued need in the art for an input interface, a handheld electronic device and a method of producing an input interface which address some of the above shortcomings. In particular, there is a continued need in the art for an input interface, a handheld electronic device and a method of producing an input interface which allows additional information on the user's action to be derived. There is also a need for such an input interface which can be manufactured at moderate additional cost and with a small number of additional processing steps.

According to an embodiment, an input interface is provided. The input interface comprises a display, a window overlaid on the display, and a housing supporting the window. The window has an inner face facing toward the display and an outer face. The input interface comprises a first sensor arrangement configured to sense a position of a touch action on the window in two dimensions. The first sensor arrangement comprises a first plurality of conductive traces. The input interface comprises a second sensor arrangement configured to sense a magnitude of a force applied by the touch action onto the window. The second sensor arrangement comprises a second plurality of conductive traces and a force sensing material. The first plurality of conductive traces and the second plurality of conductive traces are positioned on the inner face of the window and attached to the inner face of the window. The force sensing material is attached to the inner face of the window such that the force sensing material contacts the second plurality of conductive traces.

The first plurality of conductive traces and the second plurality of conductive traces may be formed from the same material.

The first plurality of conductive traces and the second plurality of conductive traces may be printed onto the inner face of the window.

The first plurality of conductive traces may include a first plurality of silver wires, and the second plurality of conductive traces may include a second plurality of silver wires. The first plurality of silver wires and the second plurality of silver wires may be formed directly on the inner face of the window, for example by printing. The first plurality of silver wires and the second plurality of silver wires may be formed from silver ink, which is printed onto the inner face of the window.

The first plurality of conductive traces and the second plurality of conductive traces may extend within the same plane.

The input interface may further comprise a flexible printed circuit. The flexible printed circuit may be attached to the window and electrically coupled to both the first sensor arrangement and the second sensor arrangement.

The flexible printed circuit may comprise a chip coupled to a conductive pattern of the first sensor arrangement by the first plurality of conductive traces, the chip being configured to determine the position of the touch action. The chip may be coupled to the second plurality of conductive traces to determine the magnitude of the force.

The conductive pattern of the first sensor arrangement may extend across a central area of the inner face of the window. The second plurality of conductive traces of the second sensor arrangement may be located in a peripheral area of the inner face which surrounds the central area. The peripheral area may be laterally offset from the display, such that the second plurality of conductive traces does not interfere with the light transmission of light output by the display through the window. The first plurality of conductive traces may extend into the central area.

The conductive pattern may be formed from a pattern material selected from indium tin oxide (ITO) or graphene. The pattern material may be directly applied on the inner face of the window.

The conductive pattern may be provided on a touch sensor panel which may be interposed between the inner face of the window and the display.

The display may be attached to the window by an optical clear adhesive or a UV curing adhesive. A layer of optical clear adhesive or UV curing adhesive may be interposed between the window and the display. The layer of optical clear adhesive or UV curing adhesive may cover the first plurality of conductive traces and/or the conductive pattern of the first sensor arrangement. The first plurality of conductive traces and/or the second plurality of conductive traces may be formed on a glass or plastic member. The first plurality of conductive traces and/or the conductive pattern of the first sensor arrangement may be attached to the window by the layer of optical clear adhesive or UV curing adhesive.

The force sensing material may have a first face supported on a support area of the housing and a second face abutting on the inner face of the window.

An adhesive layer may be provided to attach the window with the first and second sensor arrangements formed thereon to the housing. The adhesive layer may contact the support area and the first face of the force sensing material to attach the force sensing material to the support area.

The force sensing material may be resiliently deformable and may have electrical characteristics varying as a function of deformation. A height of the force sensing material in the unloaded state may be selected based on a gap formed between a lower face of the display and portion of the housing which delimits the gap. The lower face of the display is the face which is opposite to a light-emitting face of the display, and the portion of the housing which delimits the gap may be an intermediate wall of the housing or a shell of the housing which is opposite to the side on which the window is provided.

The force sensing material may be printed onto the inner face of the window.

The force sensing material may be formed as a separate element which is attached to the inner face of the window.

According to another embodiment, an input interface is provided. The input interface comprises a display, a window overlaid on the display, and a housing supporting the window. The input interface comprises a first sensor arrangement configured to sense a position of a touch action on the window in two dimensions. The first sensor arrangement comprises a first plurality of conductive traces. The input interface comprises a second sensor arrangement configured to sense a magnitude of a force applied by the touch action onto the window. The second sensor arrangement comprises a second plurality of conductive traces and a force sensing material. The first plurality of conductive traces and the second plurality of conductive traces are positioned on and attached to the same carrier plane. The first plurality of conductive traces and the second plurality of conductive traces may be applied to the carrier plane by printing. The first plurality of conductive traces and the second plurality of conductive traces may be formed from the same material. The carrier plane may be the inner face of the window. The carrier plane may be a surface of a touch sensor panel which is interposed between the window and the display.

According to another embodiment, a handheld electronic device is provided. The handheld electronic device comprises the input interface of any aspect or embodiment. The handheld electronic device comprises a processing device coupled to the input interface and configured to control operation of the handheld electronic device as a function of both the position of the touch action and the magnitude of the force.

When the input interface has a flexible printed circuit with a chip provided thereon which determines both the position of the touch action and the magnitude of the force, the processing device may be electrically connected to the chip to retrieve information on the position of the touch action and on the magnitude of the force from the chip. The flexible printed circuit may have a connector electrically connected to the processing device.

According to another embodiment, a method of producing an input interlace is provided. A first plurality of conductive traces is formed on a face of a window to provide a first sensor arrangement to sense a position of a touch action in two dimensions. A second plurality of conductive traces is formed on a peripheral area of the face of the window to provide a second sensor arrangement to sense a magnitude of a force applied by the touch action. A force sensing material is attached to the face of the window such that the force sensing material contacts the second plurality of conductive traces. The window with the first and second sensor arrangements formed thereon is attached to a housing of a handheld electronic device.

The first plurality of conductive traces and the second plurality of conductive traces may be formed from the same material. The first plurality of conductive traces and the second plurality of conductive traces may be formed concurrently on the face of the window. The first plurality of conductive traces and the second plurality of conductive traces may be formed in the same printing step.

The force sensing material may be applied onto the face of the window by printing. The force sensing material may be resiliently deformable. The force sensing material may have electrical characteristics which vary as a function of deformation.

According to another embodiment, a method of producing an input interface is provided. A first plurality of conductive traces is formed on a carrier plane to provide a first sensor arrangement to sense a position of a touch action in two dimensions. A second plurality of conductive traces is formed on the carrier plane to provide a second sensor arrangement to sense a magnitude of a force applied by the touch action. A force sensing material is attached to the carrier plane such that the force sensing material contacts the second plurality of conductive traces. The first plurality of conductive traces and the second plurality of conductive traces may be formed simultaneously. The first plurality of conductive traces and the second plurality of conductive traces may be formed from the same material and may be applied to the carrier plane by printing. The carrier plane may be a surface of a touch sensor panel which is interposed between the window and the display.

The input interface, handheld electronic device and method of various embodiments allow a magnitude of a force to be sensed. The force measurement provides additional information, supplementing the x- and y-coordinates defining the position of the touch actuation. The force may be determined even when the user places a rigid object, such as a pen-type device, on the transparent window member. The additional information quantifying the magnitude of the force may be used in controlling the operation of a handheld electronic device. The ways in which a user may interact with the handheld electronic device may thereby be enhanced, using the force magnitude applied in the touch action as an additional source of information. The operation of the handheld electronic device may also be controlled in an intuitive way, taking into account the strength at which a user pushes against the window.

The additional costs associated with forming the second sensor arrangement are moderate. The second plurality of conductive traces, which may act as electrodes of the force sensor, is formed on the inner face of the window where the first plurality of conductive traces, which act as connections for the touch sensor, is provided. This allows conductive traces of the second sensor arrangement to be formed efficiently, e.g. in the same processing station in which conductive traces of the first sensor arrangement are also formed. Similarly, the force sensing material is attached to the inner face of the window, without requiring a dedicated carrier for the force sensing material. The force sensing material may be interposed between a peripheral area of the inner face of the window and a support area of the housing.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative for embodiments.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. A coupling between components may also be established over a wireless connection. Functional blocks may be implemented in hardware, firmware, software or a combination thereof. While handheld electronic devices having an input interface of an embodiment may be wireless communication devices such as cellular telephone, personal digital assistants, or other handheld devices having communication capabilities, the input interface is not limited to being used in such communication devices.

Handheld electronic devices having an input interface will be described. The input interface has a first sensor arrangement to detect a position of a touch action in a spatially resolved manner. The first sensor arrangement is operative as a touch sensor. The input interface additionally has a second sensor arrangement separate from the first sensor arrangement and configured to sense a magnitude of a force applied by the touch action. The second sensor arrangement is interposed between a transparent window and a support section of a housing which supports the window. As will be described in more detail with reference to the drawings, the second sensor arrangement may have a second plurality of conductive traces and a force sensing material. According to embodiments, a first plurality of conductive traces which serve as electrodes or wires of the first sensor arrangement and a second plurality of conductive traces which serve as electrodes of the second sensor arrangement are formed on the same carrier plane. The carrier plane may be an inner face of the window, which faces toward a display. Other carrier planes may be used.

Figure 1:
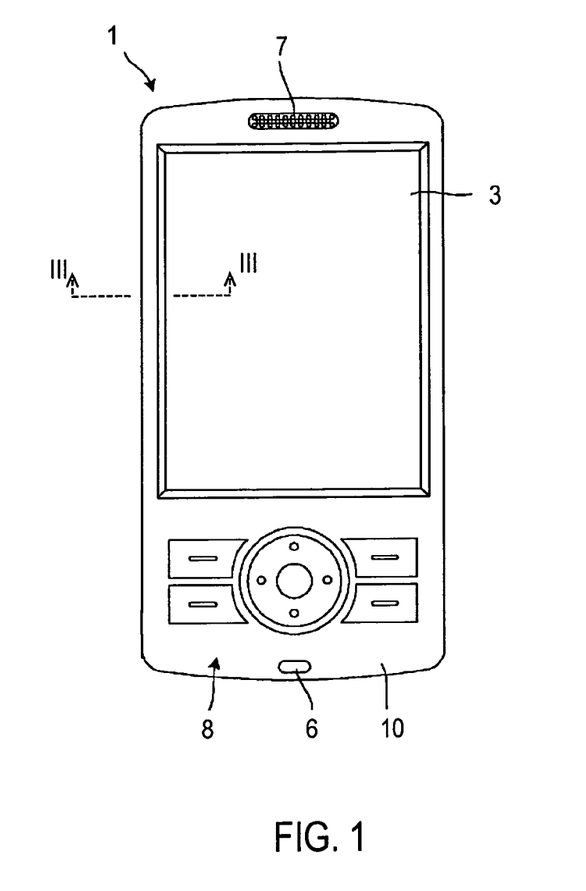
FIG. 1 is a front view of a handheld electronic device according to an embodiment.
Figure 2:
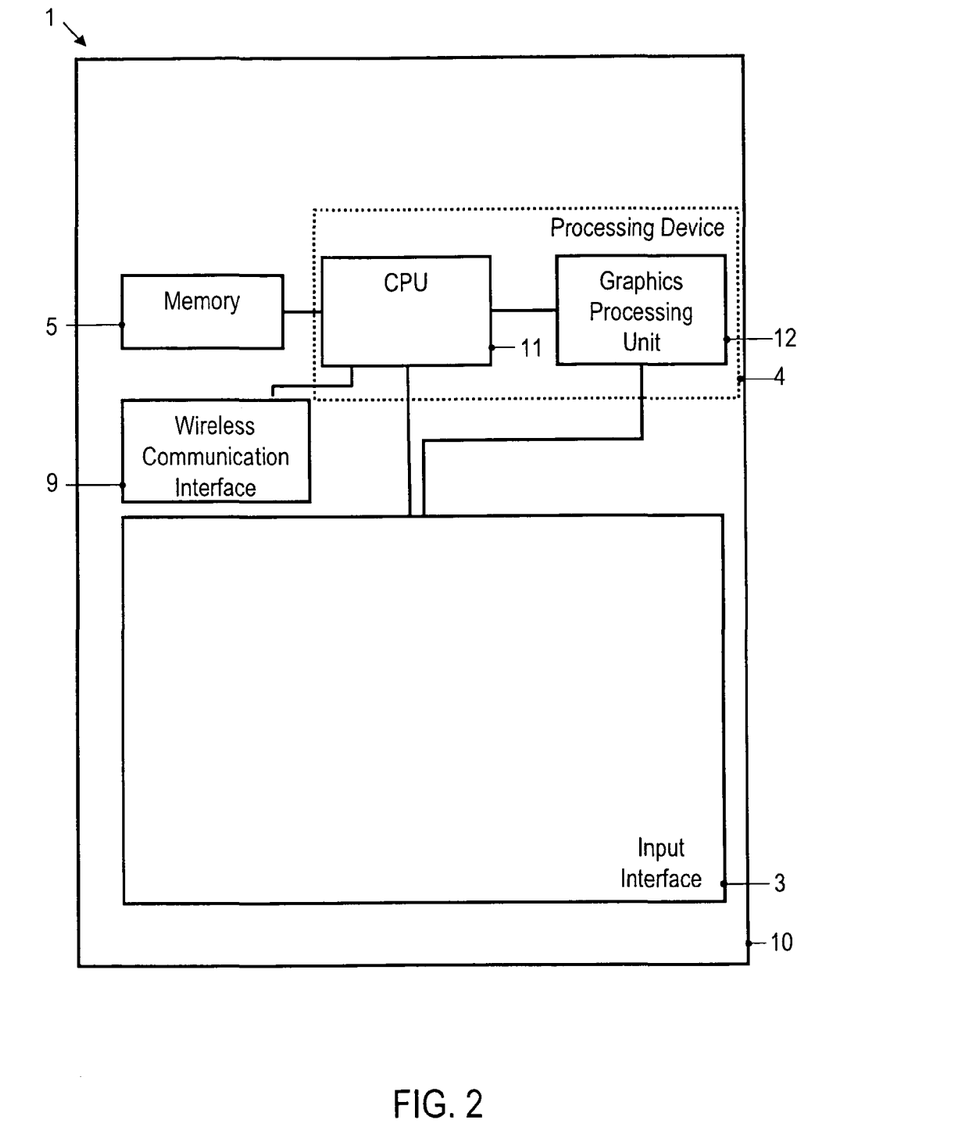
FIG. 2 is a schematic block diagram of the handheld electronic device of FIG. 1.

FIG. 1 is a front view of a handheld electronic device 1 and FIG. 2 is a schematic block diagram representation of the handheld electronic device 1. The handheld electronic device 1 has an input interface 3. The input interface 3 includes a first sensor arrangement to sense a position of a touch action on the input interface and a second sensor arrangement to sense a force applied by the touch action. The input interface 3 includes a display, thereby implementing a touch-sensitive screen. The handheld electronic device 1 has a processing device 4 coupled to the input interface 3. The processing device 4 may be one processor or may include plural processors, such as a main processor 11 and a graphics processing unit 12. The processing device 4 may perform processing and control operations. The processing device 4 may be configured such that, at least in some modes of operation, it controls operation of the handheld electronic device 1 based on both a position of a touch action and a force applied by the touch action. The processing device 4 may control operation of the handheld electronic device 1 in accordance with instruction code stored in a memory 5.

The handheld electronic device 1 may be operative as a handheld communication device, e.g. a cellular telephone, a personal digital assistant, or similar. The handheld electronic device 1 may include components for voice communication, which may include a microphone 6, a speaker 7, and a wireless communication interface 9 for communication with a wireless communication network. In addition to the input interface 3, the handheld electronic device 1 may have separate hard keys 8, such as function and/or control keys.

With reference to FIG. 3 to FIG. 7, the configuration and operation of the input interface 3 will be explained in more detail.

Figure 3:
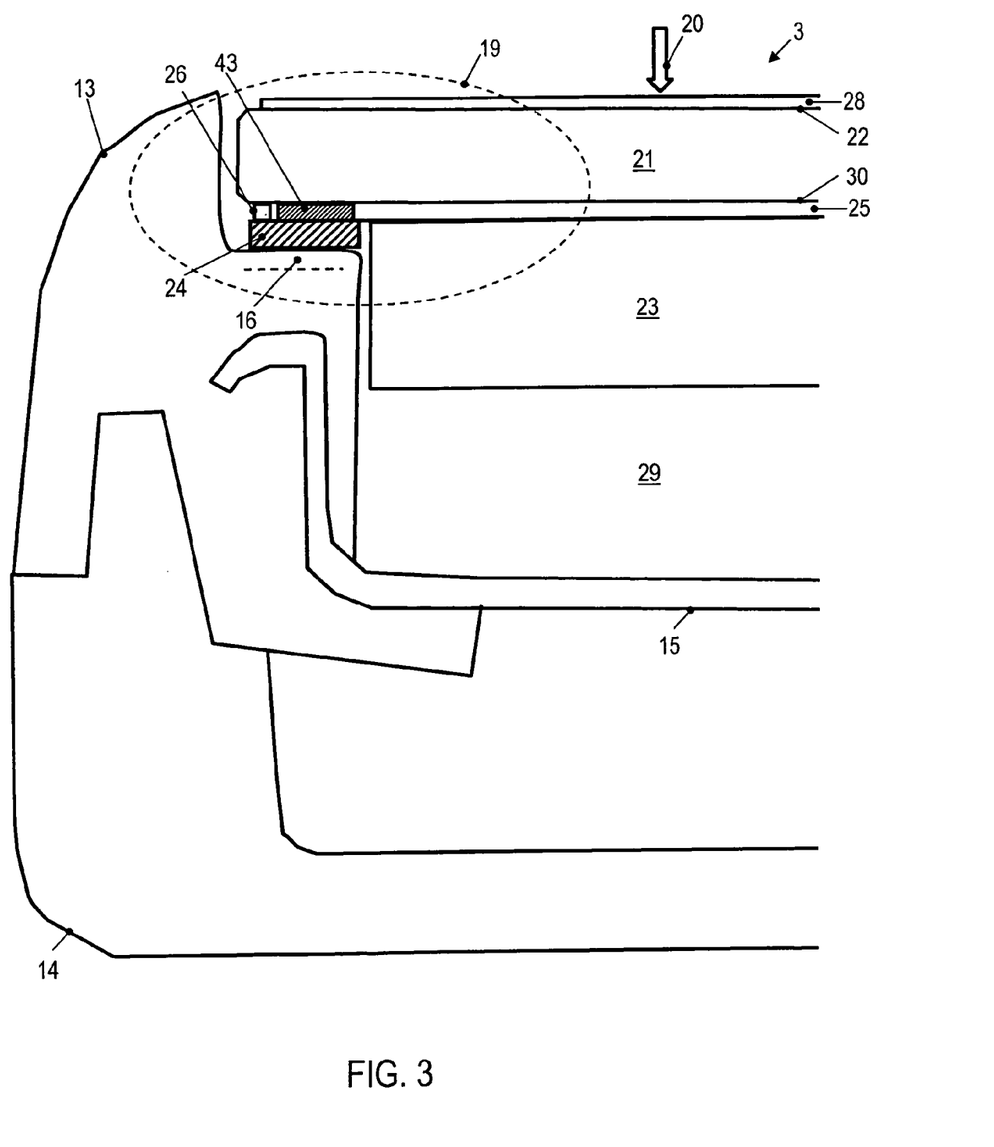
FIG. 3 is a cross-sectional view through the handheld electronic device showing the input interface according to an embodiment in partial cross-sectional view along line in FIG. 1.

FIG. 3 shows a partial cross-sectional view through the handheld electronic device 1 along line in FIG. 1.

The input interface 3 is arranged in an opening of a housing 10 of the handheld electronic device 1. The housing 10 may consist of plural components, such as a first shell 13, a second shell 14, and an intermediate wall 15 which are attached to each other. The first shell 13 defines an opening in which the input interface 3 is arranged. At a periphery of the opening, the first shell 13 has a support area 16. The support area 16 supports the input interface 3. The support area 16 also serves as a force support area which provides counter-force acting onto the input interface 3 when the user presses against the input interface 3.

The input interface 3 generally has a transparent window 21 and a display 23. The window 21 has an outer face 22 and an inner face 30 which faces toward a light-emitting face of the display 23 so as to oppose the light-emitting face of the display 23. The window 21 is offset from the display 23 in a direction perpendicular to the inner face 30. Accordingly, the transparent window 21 and the display 23 extend parallel to each other and at a distance from each other. The display 23 may be a liquid crystal display (LCD), a light emitting diode (LED)-display or an organic, light emitting diode (OLED)-display. An air gap 29 may be formed in an interior of the housing adjacent the display 23 between the display 23 and the intermediate member 15. A protective layer 28 may be applied on an outer face of the window 21.

On the inner face 30 of the window 21, a first sensor arrangement is formed. The first sensor arrangement is configured to sense a position of a touch action in a spatially resolved manner in two spatial dimensions. The first sensor arrangement may be configured to provide information on the x- and y-coordinates at which the user pushes against the input interface 3. The first sensor arrangement may be configured as a capacitive touch sensor. The first sensor arrangement may include a first plurality of conductive traces which serve as connectors or electrodes which connect a conductive pattern of the first sensor arrangement to a chip.

A second sensor arrangement is arranged on the inner face 30 of the window 21. The second sensor arrangement may include a second plurality of conductive traces which are located on the inner face 30 of the window 21. The second plurality of conductive traces allows electrical characteristics of a force sensing material 43 to be measured. The second plurality of conductive traces may act as electrodes for the force sensor. The force sensing material 43 is interposed between the transparent window 21 and the support section 16 of the housing 10. An upper face of the force sensing material 43 may directly contact the inner face 30 of the window 21. An opposite lower face of the force sensing material 43 may be attached to the support section 16 by an adhesive layer 24. The adhesive layer 24 may be a glue layer. The adhesive material 24 may be a double adhesive tape, for example. The adhesive material 24 may be less resilient than the force sensing material 43. A bulk modulus of the adhesive material 24 may be greater than a bulk modulus of the force sensing material 43.

When the force sensing material 43 is deformed in response to a force 20 exerted onto the window 21 of the user interface 3, the second plurality of conductive traces allow the resultant change in electrical characteristics to be measured. The magnitude of the force 20 can be derived from the electrical characteristics or the change in electrical characteristics. For illustration, a resistance between a pair of conductive traces of the second sensor arrangement may be measured. The resistance may change as a function of density of the force sensing material 43 which is overlaid on the pair of conductive traces. A clearance 17 may optionally be provided at an outer side of the force sensing material 43, so as to allow the force sensing material 43 to extend into the gap 17 upon compression of the force sensing material 43 in response to force 20. Alternatively or additionally, separate patches of the force sensing material 43 may be provided on separate locations along the circumference of the inner face 30 of the window 21, which are spaced from each other so as to so as to allow the patches of force sensing material 43 to extend towards each other upon compression of the force sensing material 43.

The second sensor arrangement is located at a peripheral area of the inner face 30 of the window 21. The second plurality of conductive traces of the second sensor arrangement which are used to measure the magnitude of the force and the first plurality of conductive traces of the first sensor arrangement may be spatially separated. The second plurality of conductive traces of the second sensor arrangement, which acts as force sensor, may be made from the same material as the first plurality of conductive traces of the first sensor arrangement, which acts as touch sensor. The second plurality of conductive traces of the second sensor arrangement and the first plurality of conductive traces of the first sensor arrangement may be made from silver, e.g. from silver ink.

A transparent layer 25 of material may be arranged between a central area of the inner face 30 of the window 21 and the display 23 to attach the display 23 to the window 21. The layer 25 may be made from optical clear adhesive or a UV curing adhesive. A sealing material 26 may be arranged at an outer boundary of the inner face 30 of the window 21 and may extend toward the support area 16 of the housing 10. The sealing material 26 may be optical clear adhesive or a UV curing adhesive. The sealing material 26 and the transparent layer 25 may be formed simultaneously when the input interface 3 is produced.

The configuration of the input interface 3 and configurations of the first and second sensor arrangements will be described in more detail with reference to FIG. 4 to FIG. 7.

Figure 4:
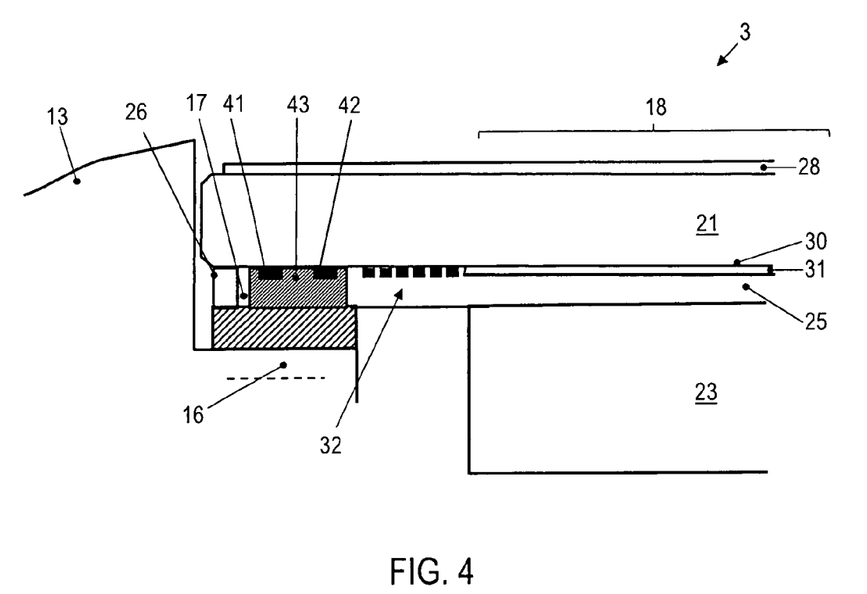
FIG. 4 is a detail view of the input interface according to an embodiment in cross-sectional view.

FIG. 4 shows a portion of the input interface 3 indicated by broken line 19 in FIG. 3 in an enlarged partial cross-sectional view. A first sensor arrangement which acts as touch sensor and a second sensor arrangement which acts as force sensor are attached to the window 21 at the inner face of the window 21.

The first sensor arrangement detects a location at which the input interface 3 is actuated. The first sensor arrangement may be configured as a capacitive touch sensor. The first sensor arrangement may include a conductive pattern 31 which is arranged on a central area of the inner face 30 of the window 21. The conductive pattern 31 may be arranged such that it overlays the display 23. The conductive pattern may be a diamond-shaped pattern. The conductive pattern 31 may be formed from a transparent material, such as indium tin oxide (ITO), graphene, or another transparent material. Alternatively or additionally, the conductive pattern 31 may be formed such that it does not obstruct the light emitted from pixels of the display 23. For illustration, the conductive pattern 31 may include thin strips of conductive material which are arranged such that they are located above the boundary of adjacent pixels of the display 23. In this case, the conductive pattern 31 does not have to be formed from a transparent material. The conductive pattern 31 allows light emitted from the display 23 to be seen in a visible area 18 of the input interface 3.

The first sensor arrangement may include first plurality of conductive traces 32. The first plurality of conductive traces 32 may connect the conductive pattern 31 to an integrated semiconductor circuit, such as a chip. The first plurality of conductive traces 32 may extend into the central area of the inner face 30 of the window 21, but may generally be offset from the visible area 18. The visible area 18 is the area in which the light output by the display 23 is transmitted to the user. The layer 25 of transparent material may cover the conductive pattern 31 and the first plurality of conductive traces 32. The conductive pattern 31 and the first plurality of conductive traces 32 may be embedded into the layer 25 of transparent material.

The second sensor arrangement includes a second plurality of conductive traces 41, 42. More than two conductive traces 41, 42 may be used. The second plurality of conductive traces 41, 42 is formed on the inner face 30 of the window 21. The second plurality of conductive traces 41, 42 may be located within an outer peripheral region of the inner face 30 of the window 21. The second plurality of conductive traces 41, 42 may be formed in a region of the inner face 30 of the window 21 which overlays the support area 16 of the housing and which does not overlap with the visible area 18.

A force applied to the input interface 3 in a touch action may push the window 21 toward the display 23. The window 21 may be displaced relative to the display 23. Alternatively or additionally, the window 21 may deform in response to the applied force. The resulting displacement or deformation causes the force sensing material 43 to deform resiliently. A resultant change in electrical characteristics may be sensed via the second plurality of conductive traces 41, 42. The resultant change allows the magnitude of the force 20 to be determined quantitatively.

For illustration rather than limitation, the force sensing material 43 may be an ink. The force sensing material 43 may have a resistance which changes as the force sensing material 43 becomes compressed. Other measurement techniques may be used, such as capacitive sensing which is responsive to a change in dielectric constant of the material interposed between a pair of conductive traces as the force sensing material 43 is compressed. In yet other implementations, the shape of the force sensing material 43 does not necessarily have to vary significantly in response to the force applied to the input interface. For illustration, the force sensing material 43 may be a piezoelectric material.

The first plurality of conductive traces 32 of the first sensor arrangement and the second plurality of conductive traces 41, 42 of the second sensor arrangement may be made from the same material. For illustration, the first plurality of conductive traces 32 of the first sensor arrangement and the second plurality of conductive traces 41, 42 of the second sensor arrangement may be silver conductive traces. The first plurality of conductive traces 32 of the first sensor arrangement and the second plurality of conductive traces 41, 42 of the second sensor arrangement may be formed in the same processing step, e.g. when conductive traces are printed onto the inner face 30 of the window 21 when producing the input interface 3.

The conductive traces of the first sensor arrangement may also be arranged in plural different planes. Plural conductive traces of the first sensor arrangement may be located directly on the inner face 30 of the window 21, while some other conductive traces of the touch sensor may be located in a plane offset from the inner face 30 of the window 21. Thereby, a layered structure of conductive traces may be formed. Alternatively or additionally, at least some of the conductive traces of the second sensor arrangement may also be arranged in different planes. A layered structure may be formed in which some conductive traces of the second sensor arrangement do not extend on the inner face 30 of the window 21. Insulating material may be disposed between the planes.

If conductive traces of the first sensor arrangement and/or conductive traces of the second sensor arrangement are located in different planes, there may be at least one plane in which both some conductive traces 32 of the first sensor arrangement and some conductive traces 41, 42 of the second sensor arrangement are located. This plane may correspond to the inner face 30 of the window 21. Such conductive traces lying in the same plane may be formed simultaneously. If there are plural planes in which some conductive traces 32 of the first sensor arrangement and some conductive traces 41, 42 of the second sensor arrangement are located, these conductive traces lying in the same plane may respectively be formed simultaneously.

Not only the printing of conductive traces 32 of the first sensor arrangement and of conductive traces 41, 42 of the second sensor arrangement may be performed in parallel, but also other processing. For illustration, if insulating layers are to be applied both on some conductive traces of the first sensor arrangement and on some conductive traces of the second sensor arrangement, the insulating layers may be applied simultaneously. This allows the second sensor arrangement to be formed in parallel with the first sensor arrangement when the input interface is produced.

One integrated semiconductor circuit, e.g. one chip, may be used for determining both the position of the touch action based on data retrieved using the first sensor arrangement and the magnitude of the force applied by the touch action based on data retrieved using the second sensor arrangement. The chip of a touch sensor may be re-configured so as to perform force measurements using the second sensor arrangement. The chip may be a touch sensor chip which is electrically connected to the plurality of conductive traces of the second sensor arrangement, i.e., of the force sensor. A firmware upgrade may be performed to configure the chip to perform force sensing operations, in addition to sensing a position of a touch action.

Figure 5:
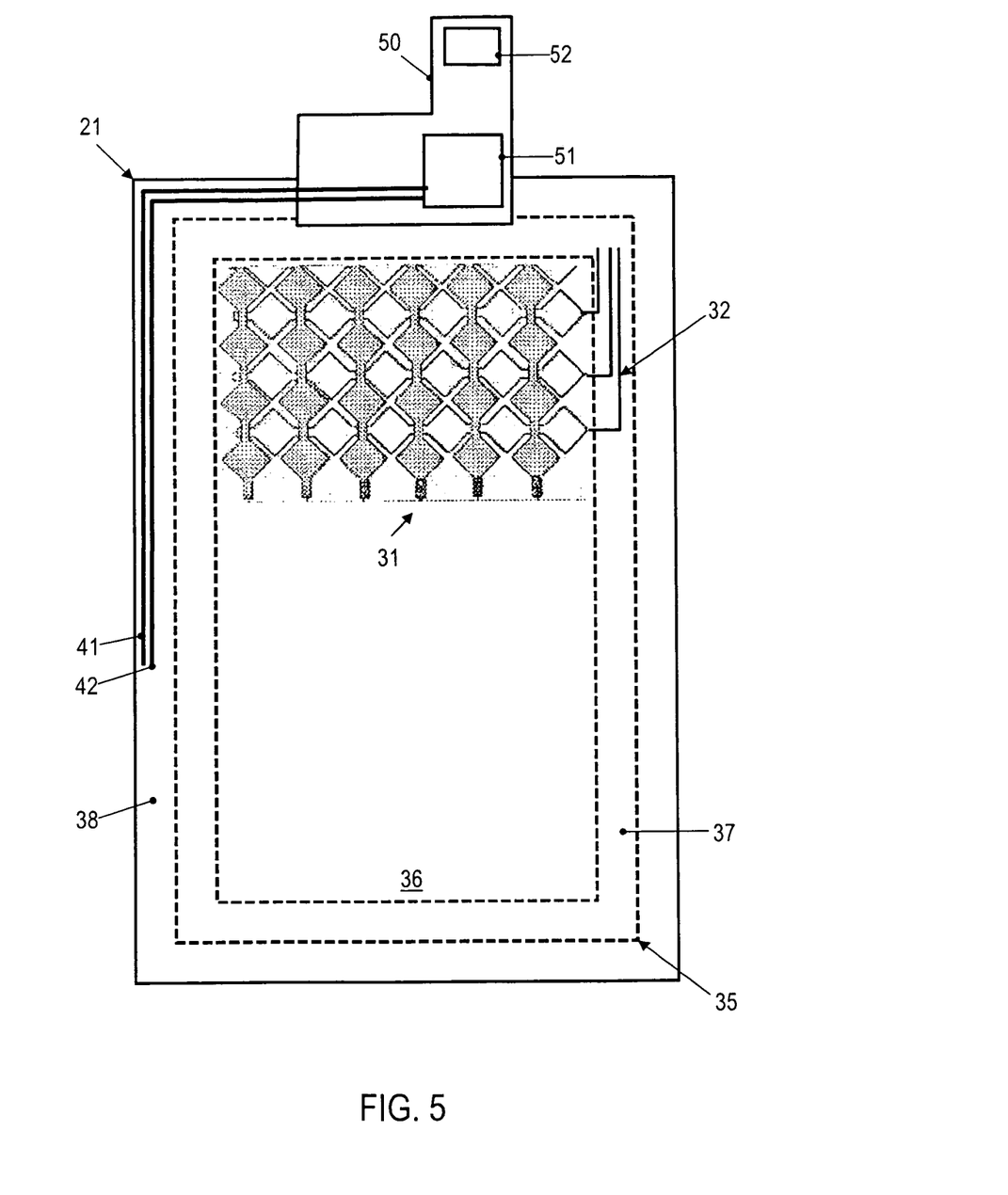
FIG. 5 is a plan view of a window of an input interface according to an embodiment.

FIG. 5 is a plan view of a window 21 of an input interface according to an embodiment, which shows the inner face 30 of the window 21. The window 21 may be used in the input interface 3 of the handheld electronic device 1 of FIG. 1 and FIG. 2.

The inner face 30 of the window 21 which faces toward the display 23 has a central area 35 on which the first sensor arrangement for sensing the position of the touch action is provided. A conductive pattern 31 is formed on a portion 36 of the central area 35. The portion 36 with the conductive pattern 31 formed thereon may be overlaid on a display. The conductive pattern 31 may be formed from various conductive materials or combinations of conductive materials, such as indium tin oxide (ITO), graphene, or other materials suitable for forming touch sensors. The conductive pattern 31 may extend throughout the portion 36. The conductive pattern 31 may be a diamond-shaped pattern.

A first plurality of conductive traces 32 of the first sensor arrangement is located on another portion 37 of the central area 35. The other portion 37 may surround the portion 36 on which the conductive pattern 31 is formed. The first plurality of conductive traces 32 are electrically coupled to the conductive pattern 31 and to a chip 51. While only a limited number of conductive traces 32 are shown in FIG. 5, the number of conductive traces 32 of the first sensor arrangement may be rather large to provide good spatial resolution of position sensing. For illustration, if the conductive pattern 31 includes a number of rows and number of columns, the first sensor arrangement may have at least one conductive trace for each row and at least one conductive trace for each column of the conductive pattern 31.

The window 21 extends beyond the central area 35. A peripheral area 38 of the inner face 30 of the window 21 extends at an outer side of the central area 35. The peripheral area 38 may completely surround the central area 35 to allow force sensing to be performed at all sides of the input interface. In other implementations, the peripheral area 38 may extend at an outer side of the central area 35 only along some of the edges of window 21.

The peripheral area 38 supports the second sensor arrangement which is configured to perform force sensing. The second sensor arrangement comprises a second plurality of conductive traces 41, 42 which are formed on the peripheral area 38. The second plurality conductive traces 41, 42 may be formed externally of the portion 36 overlaid on the display 23. In such a configuration, the conductive traces 41, 42 of the force sensor are not overlaid on the display 23. A force sensing material may be provided to cover at least a pair of conductive traces 41, 42 of the second sensor arrangement. The force sensing material may be applied along a line which surrounds the central area 35 of the touch sensor material. The force sensing material may also be applied in localized patches, e.g. along a portion of the peripheral area 38 which extends along a longitudinal side of the window 21, along another portion of the peripheral edge 38 which extends along transverse side of the window 21, and/or along another portion of the peripheral area 38 which extends along the opposite longitudinal side.

The second plurality of conductive traces 41, 42 of the second sensor arrangement may be connected to the chip 51 which also evaluates signals retrieved over the first plurality conductive traces 31 of the first sensor arrangement. The chip 51 is an integrated semiconductor circuit which may perform operations of both detecting a position of a touch action based on signals on the conductive traces 32 and sensing a force magnitude based on signals on the conductive traces 41, 42. Other configurations using a dedicated chip for force sensing may be used in other embodiments.

The chip 51 may be provided on a flexible printed circuit 50. The flexible printed circuit 50 also has conductive connections for the force sensing operation. The first plurality of conductive traces 32 and the second plurality of conductive traces 41, 42 may extend onto the flexible printed circuit 50 and/or may be electrically connected to the flexible printed circuit 50. A connector 52 is formed on the flexible printed circuit 50 to interface the chip 51 with the processing device 4 of the handheld electronic device 1 in which the input interface 3 is used. The chip 51 may provide information representing the location(s) at which a touch action occurs to the processing device 4 over the connector 52. The chip 51 may additionally provide information representing the magnitude of the force applied by the touch action to the processing device 4.

The first plurality of conductive traces 32 of the first sensor arrangement and the second plurality of conductive traces 41, 42 of the second sensor arrangement are both located on and attached to the same carrier plane, i.e. the inner face 30 of the window 21. This allows the second sensor arrangement to be formed in a cost-efficient manner. For illustration, the second plurality conductive traces 41, 42 of the second sensor arrangement and the first plurality of conductive traces 31, 32 of the first sensor arrangement may both be formed by printing. The second plurality conductive traces 41, 42 of the second sensor arrangement and the first plurality of conductive traces 31, 32 of the first sensor arrangement may be formed in one printing process. The second plurality conductive traces 41, 42 of the second sensor arrangement and the first plurality conductive traces 31, 32 of the first sensor arrangement may be formed simultaneously. The force sensing material may subsequently be applied on the second plurality of conductive traces 41, 42 of the second sensor arrangement. The force sensing material may be an ink having electrical characteristics that vary as a function of density. One example for such a material is an ink with trade name UNEO, available from UCCTW. There is a variety of other resiliently deformable materials which may be used as force sensing material.

A ring seal made of optical clear adhesive, an UV curing adhesive or another sealing material may be applied around the peripheral area 38.

The second sensor arrangement may include more than one force sensor to perform force sensing at various locations around the periphery of the input interface. The force sensing may be performed at locations which are spaced from the corners of the input interface. The force sensing may be performed at central regions of the longitudinal and/or transverse edges of the window 21.

Figure 6:
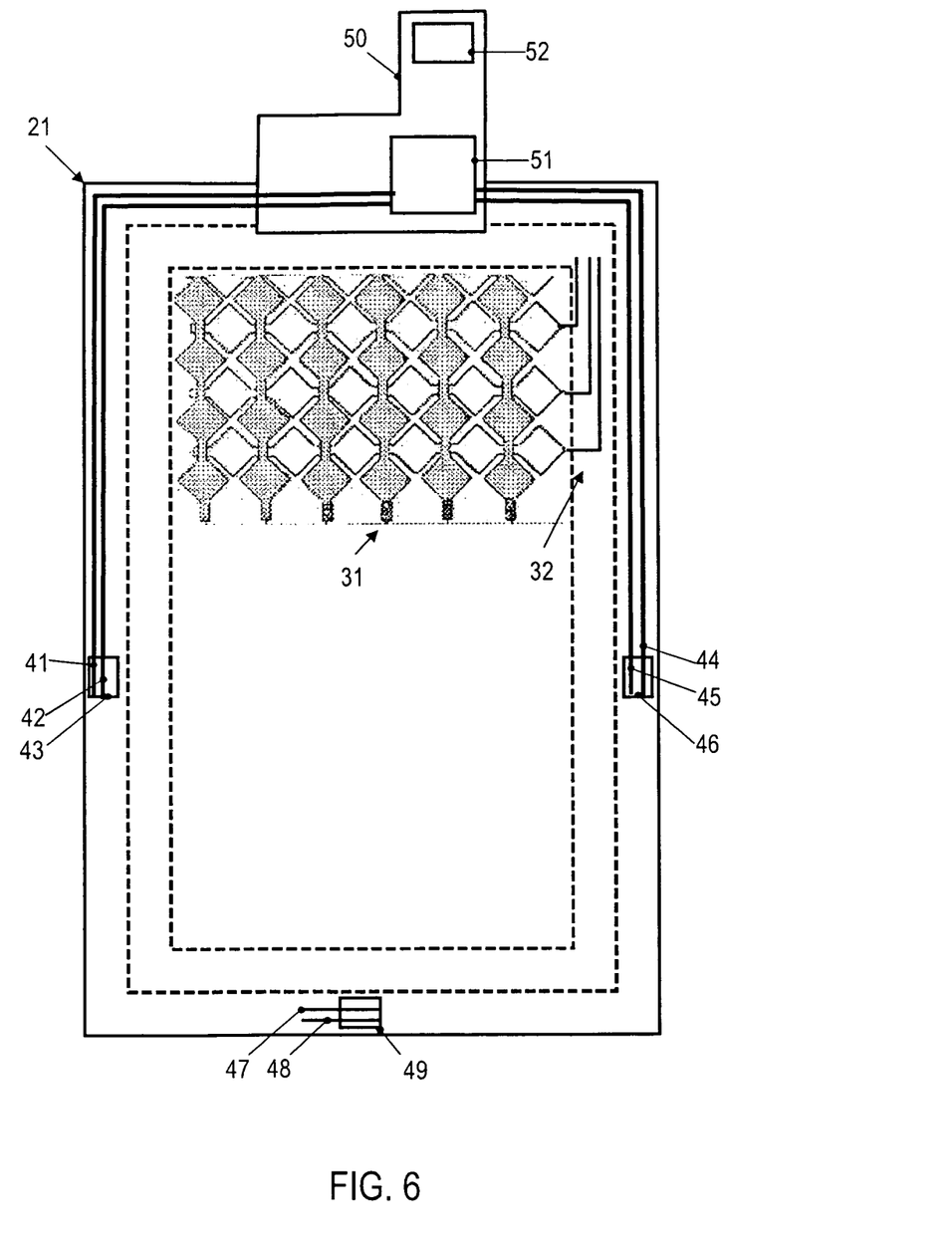
FIG. 6 is a plan view of a window of an input interface according to an embodiment.

FIG. 6 is a plan view of a window 21 of an input interface according to an embodiment, in which the second sensor arrangement has several force sensors. FIG. 6 shows the inner face 30 of the window 21. The window 21 may be used in the input interface 3 of the handheld electronic device 1 of FIG. 1 and FIG. 2.

The second sensor arrangement comprises a first force sensor having a first pair of conductive traces 41, 42 and a force sensing material 43 applied thereon. The first force sensor senses a force at a longitudinal edge of the input interface. The second sensor arrangement comprises a second force sensor having a second pair of conductive traces 44, 45 and a force sensing material 46 applied thereon. The second force sensor senses a force at an opposite longitudinal edge of the input interface. The second sensor arrangement comprises a third force sensor having a third pair of conductive traces 47, 48 and a force sensing material 49 applied thereon. The third force sensor senses a force at a transverse edge of the input interface.

The conductive traces 41, 42, 44, 45, 46 and 47 are all connected to the chip 51. In embodiments, different force sensors may share one of the conductive traces. This conductive trace may correspond to ground, for example.

Various techniques may be used to derive information on the spatial distribution of the force acting onto different regions of the input interface from the electrical signals sensed over the conductive traces. For illustration, force sensing material having electrical characteristics which vary as a function of resilient deformation or as a function of the force acting on the material may be applied locally in certain regions, to thereby increase the spatial sensitivity of the force sensing. Alternatively or additionally, the distance between pairs of conductive traces which form a force sensor may be smaller in a region in which the respective force sensor is intended to be sensitive. Distances between conductive traces of the second sensor arrangement may therefore vary along the peripheral area 38. Alternatively or additionally, even when the force sensing material is applied on the plurality of conductive traces so as to cover the plurality of conductive traces throughout the peripheral area 38, information on the forces pushing the window toward the display 23 at the various edges of the input interface may be derived from calibration data. For illustration, the chip 51 may perform a look-up operation to determine the magnitudes of forces acting at the various edges based on the signals received from plural force sensors. Information on the position of the touch action determined by the first sensor arrangement may be utilized to derive the distribution of the forces acting at various edges of the input interface.

When the second sensor arrangement has plural force sensors, the operation of the input interface 3 is enhanced further. For illustration, the force magnitudes sensed by the plural force sensors may be combined with each other to determine the total force. Alternatively or additionally, the force magnitudes sensed by the plural force sensors may be used to verify information on a location of a touch action. Alternatively or additionally, the force magnitudes sensed by the plural force sensors may be combined with the position information captured using the first sensor arrangement to discriminate different types of touch actions, such as one finger versus plural fingers.

The input interface allows a force magnitude to be captured in addition to information on a position at which a touch action occurs. Operation of the handheld electronic device 1 in which the input interface is used may be controlled based not only the location of the touch action, but also based on the force magnitude.

An input interface 3 configured as described with reference to FIG. 3 to FIG. 6 does no longer require a dedicated touch sensor panel. In conventional input interfaces, such a dedicated touch sensor panel is provided as a separate element in between the display and the window of an input interface to act as a carrier for the conductive pattern of the touch sensor and/or for the conductive traces of the touch sensor. Costs and space requirements may be reduced when both the conductive traces of the touch sensor and the conductive traces of the force sensor are formed on and attached to the window. A dedicated touch sensor panel may then be omitted. It will be appreciated that it is still possible to additionally use a touch sensor panel interposed between the inner face 30 of the window 21 and the display 23. Such a touch sensor panel may have lateral dimensions which correspond to those of the display 23. The touch sensor panel may act as a carrier for the conductive pattern 31 of the first sensor arrangement, for example.

Figure 7:
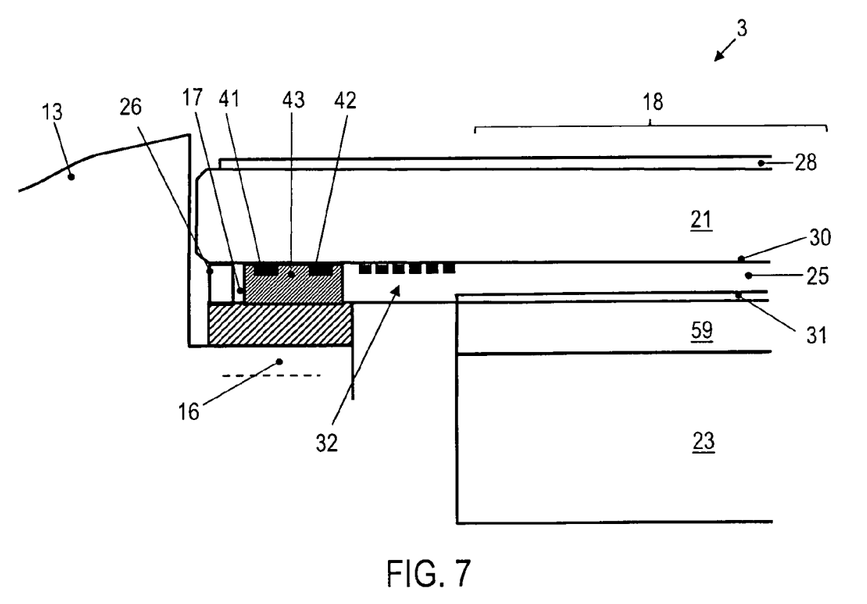
FIG. 7 is a cross-sectional view through the handheld electronic device showing the input interface according to another embodiment in partial cross-sectional view.

FIG. 7 is cross-sectional view of an input interface along line in FIG. 1, showing the input interface of another embodiment in enlarged cross-sectional view. The input interface 3 of FIG. 7 includes a touch sensor panel 59 which is interposed between the display 23 and the central area of the window 21.

Figure 8:
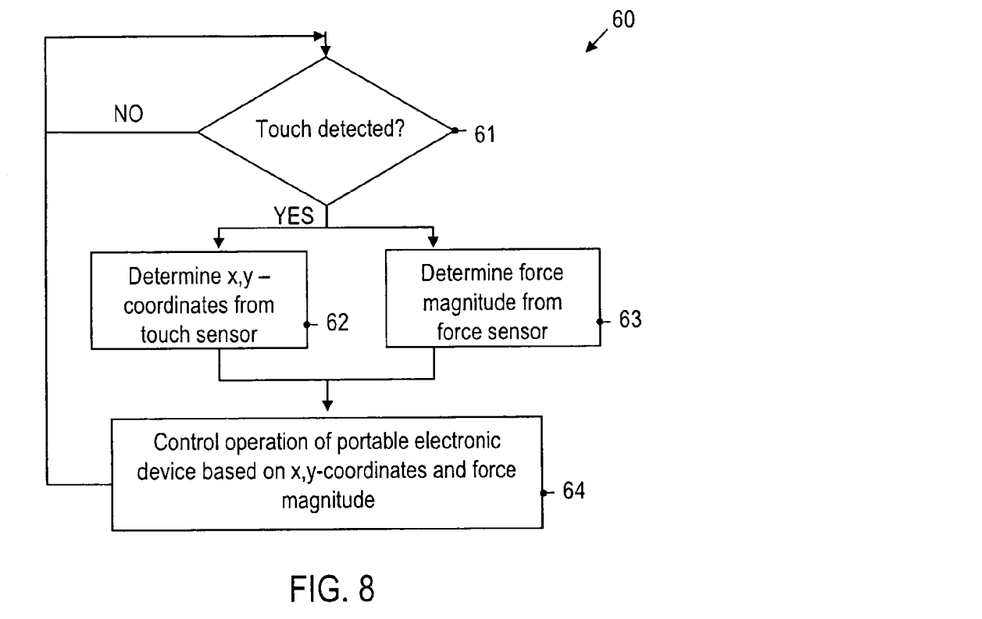
FIG. 8 is a flow chart of a method performed by a handheld electronic device according to an embodiment.

FIG. 8 is a flow chart of a method 60 which may be performed by the processing device 4 of the handheld electronic device 1 which has the input interface according to an embodiment.

At 61, it is determined whether a touch action at the user interface is detected. The monitoring at 61 is continued if there is no touch action. If a touch action is detected, at 62, information on the position at which the touch action occurs is determined based on information captured using the first sensor arrangement which operates as a touch sensor. The information on the position may include x- and y-coordinates of the touch action. In parallel, at 63 the force magnitude is determined based on data captured using the second sensor arrangement which operates as a force sensor.

At 64, the operation of the handheld electronic device is controlled based both on the information on the position and the force magnitude. This may be done in various ways, depending on processes which are presently being carried out by the handheld electronic device. For illustration, when scrolling through a document, the scroll direction may be determined based on the x- and y-coordinates of the touch action, while the scroll speed may be set based on the sensed force magnitude. In a shuffle operation, the list of media items in which shuffling is performed may be selected based on the x- and y-coordinates of the touch action, while the degree of randomization may be set based on the sensed force magnitude. In a media player mode, a fast forward or fast rearward operation may be selectively performed based on the x- and y-coordinates of the touch action, while the speed of the fast forward, for example, is set based on the sensed force magnitude. In an operation in which a user sets a number in the handheld electronic device, such as time of a timer, the number may be selectively increased or decreased based on the x- and y-coordinates of the touch action, while the increment or decrement may be determined by the sensed force magnitude. There is a wide variety of other scenarios where the force magnitude provides additional control functions which allow the user to control operation of the handheld electronic device in an intuitive way.

When the operation of the handheld electronic device is controlled based on the force magnitude, a discretization may be used. For illustration, the sensed force magnitude may be compared to a plurality of force values to determine which action is to be taken.

When the operation of the handheld electronic device is controlled based on the force magnitude, the monitoring of the force may be continued during an ongoing touch action. This allows a user to keep a finger or pointing device in engagement with the surface of the input interface while controlling the operation over the force magnitude.

In the input interface, a first plurality of conductive traces of a first sensor arrangement which acts as touch sensor and a second plurality of conductive traces of a second sensor arrangement which acts as force sensor may be formed on a common carrier plane. The carrier plane may be an inner face of a window which is overlaid on the display. Such a configuration allows a force sensor to be integrated into a handheld electronic device which has a touch sensor with moderate additional processing. When the input interface is produced, the first plurality of conductive traces and the second plurality of conductive traces may be formed concurrently, e.g. in the same printing station.

Figure 9:
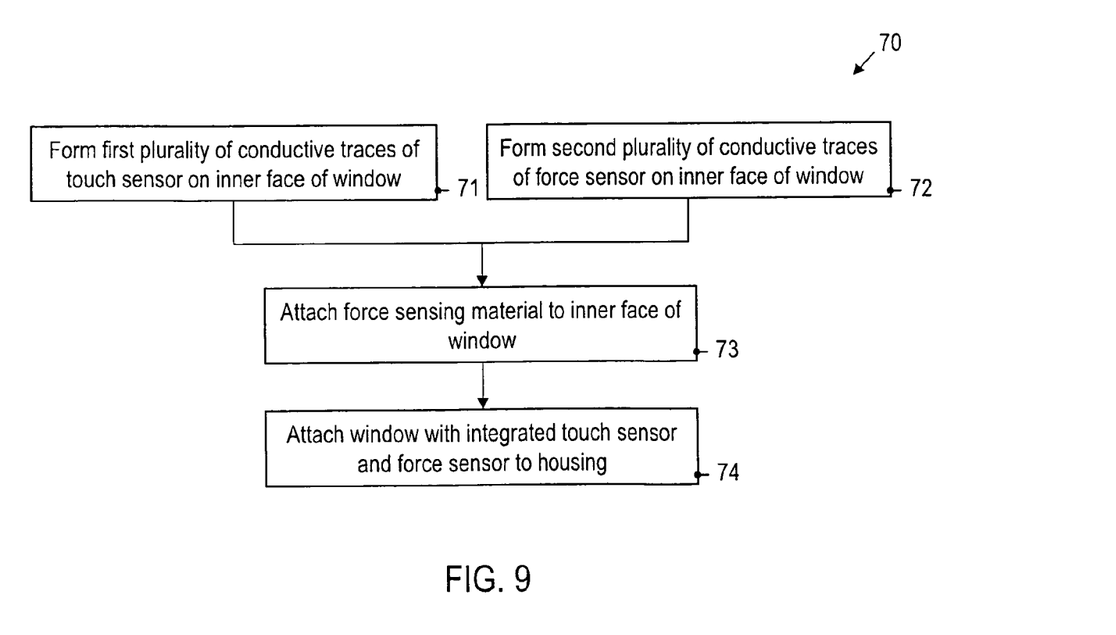
FIG. 9 is a flow chart of a method of producing an input interface according to an embodiment.

FIG. 9 is a flowchart of a method 70 of producing the input interface according to an embodiment.

At 71, a first plurality of conductive traces of a touch sensor is formed on a carrier plane, which may be the inner face of a window. Concurrently, at 72, a second plurality of conductive traces of a force sensor is formed on the carrier plane. While illustrated as separate steps in FIG. 9, the first plurality of conductive traces which are used for sensing a position of a touch action and the second plurality of conductive traces which are used for force sensing may be formed in one processing step. The first plurality of conductive traces which will be used for sensing a position of a touch action and the second plurality of conductive traces which will be used for force sensing may be formed from the same material. The first plurality of conductive traces which will be used for sensing a position of a touch action and the second plurality of conductive traces which will be used for force sensing may be made from conductive ink and may be printed onto the carrier plane in the same processing station. Other techniques may be used to concurrently form the first plurality of conductive traces and the second plurality of conductive traces on the inner face of the window.

At 73, a force sensing material is attached to the carrier plane on which the first plurality of conductive traces and the second plurality of conductive traces have been formed. The force sensing material is attached such that it contacts the second plurality of conductive traces. When plural separate patches of force sensing material are applied, each one of the patches is applied such that it contacts at least two conductive traces of the second plurality of conductive traces. The force sensing material may be applied onto the inner face of the window by printing. The force sensing material may also be formed separately and may subsequently be attached to the inner face of the window.

At 74, the window with the touch sensor and force sensor provided thereon is attached to a housing of a handheld electronic device. A layer of glue or double adhesive tape may be used to attach the force sensing material to a support area of the housing. The support area of the housing will provide a counter-force for force sensing when the user exerts a force onto the window in a touch action. The window may be attached such that the inner face is arranged so as to face toward a display panel.

The method 70 may include additional processing steps. For illustration, the conductive pattern of the first sensor arrangement used for touch sensing may also be applied directly onto the carrier plane on which the first plurality of conductive traces and the second plurality of conductive traces are located. For further illustration, a display may be attached to the window using an optical clear adhesive or UV curing adhesive. The first plurality of conductive traces comprised by the touch sensor may be embedded in the optical clear adhesive or UV curing adhesive. For further illustration, a flexible printed circuit may be attached to the window. A chip of the flexible printed circuit may be electrically coupled to both the first plurality of conductive traces and the second plurality of conductive traces. The chip may be operative to determine both a location of a touch action and a force magnitude applied in the touch action.

Figure 10:
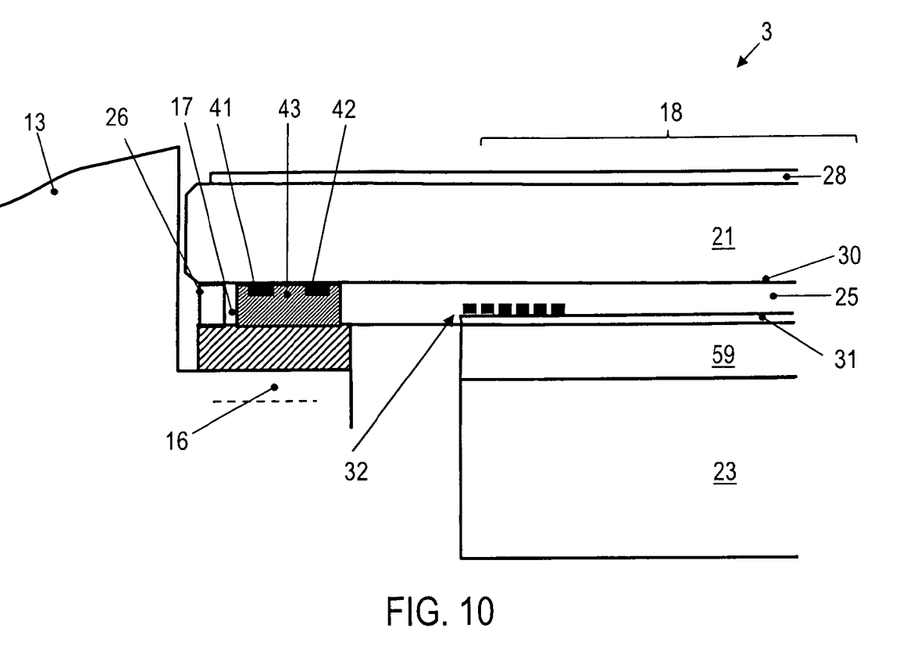
FIG. 10 is a cross-sectional view through the handheld electronic device showing the input interface according to another embodiment in partial cross-sectional view.

FIG. 10 is cross-sectional view of an input interface along line in FIG. 1, showing the input interface of another embodiment in enlarged cross-sectional view. The input interface 3 of FIG. 10 includes a touch sensor panel 59 which is interposed between the display 23 and the central area of the window 21. The conductive pattern 31 of the first sensor arrangement is formed on the touch sensor panel 59. The first plurality of conductive traces 32 is attached to the window 21 by a layer 25 of optical clear adhesive or UV curing adhesive.

While input interfaces, handheld electronic devices and methods have been described with reference to the drawings, modifications and alterations may be implemented in further embodiments. For illustration, while the second sensor arrangement operative to sense a force magnitude may include a pair of conductive traces and a force sensing material applied thereon, other implementations of the force sensor are possible. For illustration, the force sensing material may itself include a combination of a resilient insulator with electrically conductive members arranged therein at certain heights above the inner face of the window.

For further illustration, while certain implementations of the first sensor arrangement which detects the position of a touch action were described, other implementations of the first sensor arrangement may be used. The conductive pattern may be formed from a material other than ITO. A pattern different from a diamond pattern may be used.

While the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. An input interface, comprising:
a display;
a window overlaid on the display, the window having an inner face facing toward the display and an outer face;
a housing supporting the window;
a first sensor arrangement configured to sense a position of a touch action on the window in two dimensions, the first sensor arrangement comprising a first plurality of conductive traces;
a second sensor arrangement configured to sense a magnitude of a force applied by the touch action onto the window, the second sensor arrangement comprising a second plurality of conductive traces and a force sensing material, the force sensing material being resiliently deformable, the force sensing material having electrical characteristics varying as a function of deformation of the force sensing material, and the force sensing material having a first face coupled to a support area of the housing and a second face abutting on the inner face of the window; and
a layer of adhesive material that couples the force sensing material to the support area of the housing, a bulk modulus of the adhesive material being greater than a bulk modulus of the force sensing material,
wherein the first plurality of conductive traces and the second plurality of conductive traces are positioned on the inner face of the window and attached to the inner face of the window, and wherein the force sensing material is attached to the inner face of the window such that the force sensing material contacts the second plurality of conductive traces.

2. The input interface of claim 1, wherein the first plurality of conductive traces and the second plurality of conductive traces are formed from the same material.

3. The input interface of claim 2, wherein the first plurality of conductive traces and the second plurality of conductive traces are printed onto the inner face of the window.

4. The input interface of claim 2, wherein the first plurality of conductive traces include a first plurality of silver wires, and the second plurality of conductive traces include a second plurality of silver wires.

5. The input interface of claim 2, wherein the first plurality of conductive traces and the second plurality of conductive traces extend within the same plane.

6. The input interface of claim 1, further comprising:
a flexible printed circuit which is attached to the window and electrically coupled to both the first sensor arrangement and the second sensor arrangement.

7. The input interface of claim 6, the flexible printed circuit comprising a chip coupled to a conductive pattern of the first sensor arrangement by the first plurality of conductive traces, the chip being configured to determine the position of the touch action, the chip being further coupled to the second plurality of conductive traces to determine the magnitude of the force.

8. The input interface of claim 7, wherein the conductive pattern of the first sensor arrangement extends across a central area of the inner face of the window, and
wherein the second plurality of conductive traces of the second sensor arrangement is located in a peripheral area of the inner face which surrounds the central area and which is laterally offset from the display.

9. The input interface of claim 7,
wherein the conductive pattern is formed from a pattern material selected from indium tin oxide or graphene, the pattern material being directly applied on the inner face of the window.

10. The input interface of claim 7,
wherein the conductive pattern is provided on a touch sensor panel which is interposed between the inner face of the window and the display.

11. The input interface of claim 1,
wherein the layer of adhesive material is interposed between the support area and the first face of the force sensing material to couple the force sensing material to the support area.

12. A handheld electronic device, comprising:
the input interface of claim 1, and
a processing device coupled to the input interface and configured to control operation of the handheld electronic device as a function of both the position of the touch action and the magnitude of the force.

13. A method of producing an input interface, the method comprising:
forming a first plurality of conductive traces on a face of a window to provide a first sensor arrangement to sense a position of a touch action in two dimensions,
forming a second plurality of conductive traces on a peripheral area of the face of the window to provide a second sensor arrangement to sense a magnitude of a force applied by the touch action,
attaching a force sensing material to the face of the window such that the force sensing material contacts the second plurality of conductive traces, the force sensing material being resiliently deformable, the force sensing material having electrical characteristics varying as a function of deformation of the force sensing material,
attaching the window with the first and second sensor arrangements formed thereon to a housing of a handheld electronic device, and
attaching the force sensing material to a support area of the housing using a layer of adhesive material, a bulk modulus of the adhesive material being greater than a bulk modulus of the force sensing material.

14. The method of claim 13,
the first plurality of conductive traces and the second plurality of conductive traces being formed from the same material,
the first plurality of conductive traces and the second plurality of conductive traces being formed concurrently on the face of the window.

* * * * *